United States Patent [19]

Fiorenza

[11] 4,290,349

[45] Sep. 22, 1981

[54] TOASTER ACCESSORY

[76] Inventor: Castenzio Fiorenza, 430 Main St., Yarmouth Port, Mass. 02675

[21] Appl. No.: 138,172

[22] Filed: Apr. 7, 1980

[51] Int. Cl.³ .............................................. A47J 37/08
[52] U.S. Cl. ....................................... 99/388; 16/179; 99/339; 99/391; 99/402
[58] Field of Search ................. 99/339, 402, 388, 379, 99/426, 351, 391; 16/178, 179, 184

[56] References Cited

U.S. PATENT DOCUMENTS

| | | | |
|---|---|---|---|
| 475,884 | 5/1892 | Murrey | 99/402 |
| 1,712,474 | 5/1929 | Serrell | 99/402 |
| 2,941,463 | 6/1960 | Di Cuia | 99/402 |
| 3,046,870 | 7/1962 | Bork | 99/402 |
| 4,129,067 | 12/1978 | Reiland | 99/402 |

Primary Examiner—Billy J. Wilhite
Attorney, Agent, or Firm—Morse, Altman, Oates & Dacey

[57] ABSTRACT

A toaster accessory is provided in the form of a pair of hinged foraminous panels forming a holder adapted to hold one or several slices of bread therebetween. In its preferred use, a sandwich is placed between the two panels and the holder, when closed, is dimensioned to fit into a conventional toaster so that a pre-made sandwich may be conveniently toasted therein. The hinge connection between the two panels is self-adjusting and a locking device at the opposite end is able to lock at different thicknesses. Decorative inserts may be added to the panels for making designs on the surface of the toasted bread.

8 Claims, 8 Drawing Figures

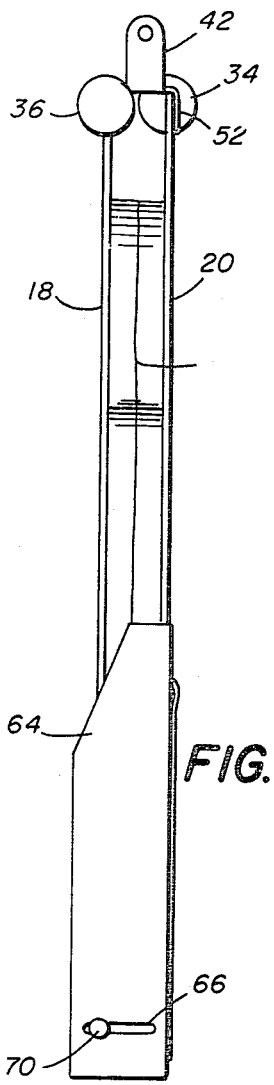
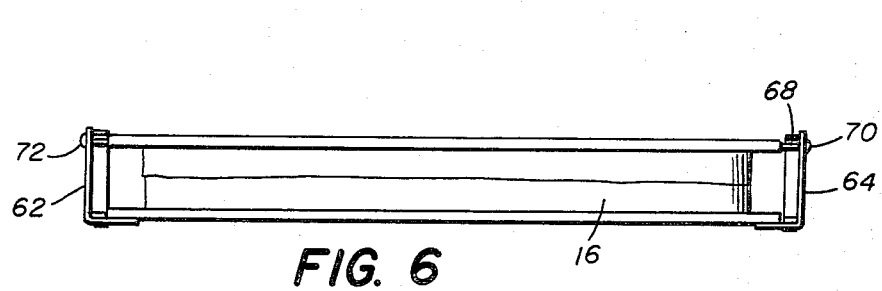
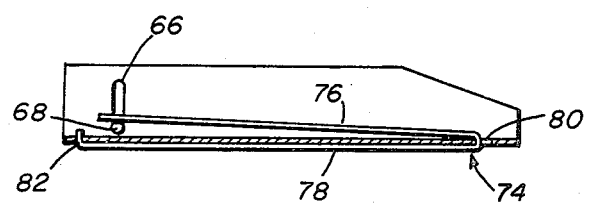
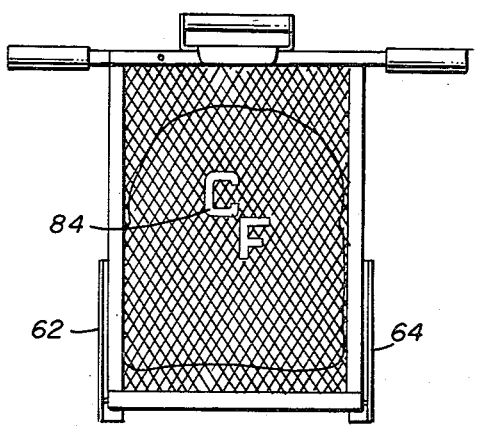
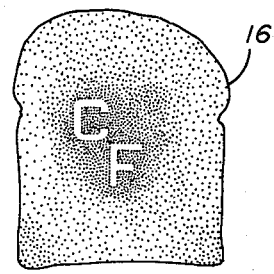

TOASTER ACCESSORY

BACKGROUND OF THE INVENTION

1. Field of the Invention

This invention relates generally to toaster accessories and is especially directed towards an adjustable holder for sandwich, placed in the holder and toasted in a conventional toaster.

2. Description of the Prior Art

Various devices have been proposed heretofore for use in holding pieces of bread, muffins, hamburgers and the like for the purpose of toasting the same in a conventional electrical toaster. While such devices have worked satisfactorily for food products of specific sizes and shapes, they have been unsatisfactory in accommodating foods of different thicknesses which are to be toasted.

It is an object of the present invention to provide a new and improved holder for one or several pieces of bread which may be in the form of a sandwich for toasting the same in a conventional toaster.

Another object of this invention is to provide a sandwich holder adapted to self-adjust to a variety of different thicknesses of sandwiches placed therein for holding the same firmly together while toasting in a conventional toaster.

SUMMARY OF THE INVENTION

This invention features an accessory for use with a conventional toaster by means of which a sandwich may be held together while being toasted. The holder comprises a pair of hinged foraminous panels between which the sandwich is placed. The panels may be swung together and locked at the top by means of a variable position latch and the bottom hinges are spring-loaded and self adjusting to accommodate sandwiches of different thicknesses. The closed holder has a maximum thickness less than the slot opening of a conventional toaster so that the holder may be slipped into a toaster in order to toast the sandwich held between the panels. Side handles extend from opposite ends of the top of the holder by means of which the holder may be easily removed from the toaster.

BRIEF DESCRIPTION OF THE DRAWINGS

FIG. 4 is a view in front elevation of the holder with a sandwich held therein, FIG. 5 is a view in end elevation thereof, FIG. 6 is a bottom plan view thereof, FIG. 7 is a detailed view showing the self adjusting hinge arrangement, and, FIG. 8 is a front elevation of a sandwich that has been toasted with a holder of the present invention.

DETAILED DESCRIPTION OF THE PREFERRED EMBODIMENT

Figure 1:
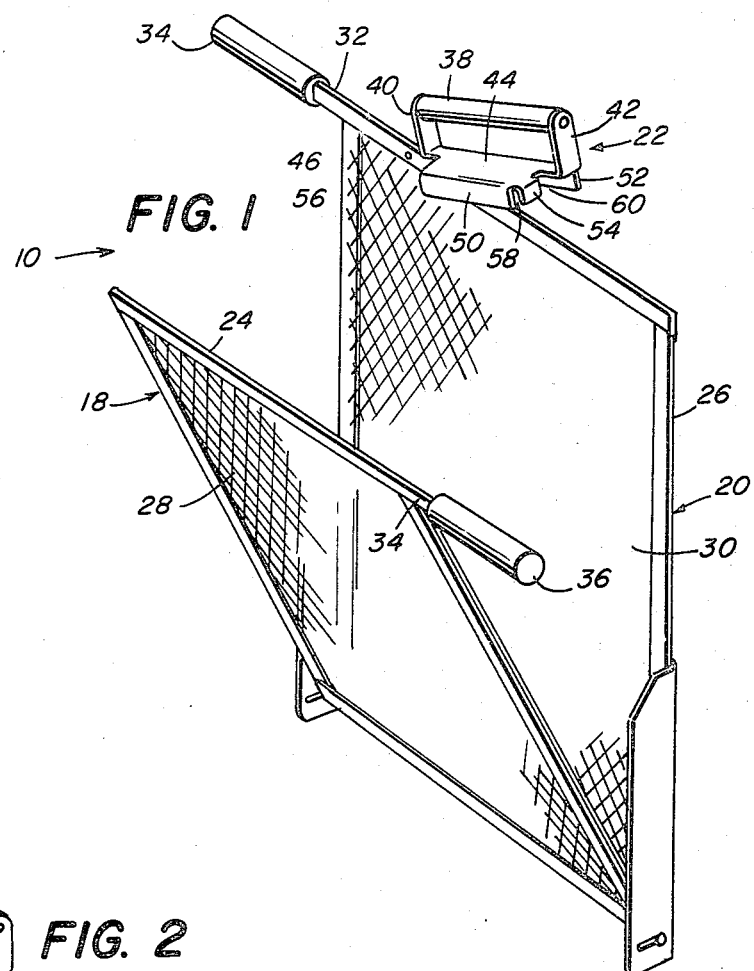
FIG. 1 is a view in perspective of a holder made according to the invention and shown in a partly open position.

Referring now to the drawings, the reference character 10 generally indicates a holder adapted to fit into an opening 12 of a standard toaster 14 whereby a sandwich 16 mounted in the holder may be toasted thereby.

The holder 10 is comprised of a pair of panels 18 and 20 hinged along the bottom edges thereof and adapted to be locked together at the top by means of a latch 22. Each panel is comprised of a rectangular frame 24 and 26 of a heat resistant, rigid material and for this purpose aluminum, stainless steel, or the like may be used to advantage. Within the frames 24 and 26 are rectangles 28 and 30 of a foraminous material such as a mesh screen which should relatively stiff and also of a heat resistant material. Again, aluminum, stainless steel, or the like may be used.

The size of each panel should exceed that of a conventional slice of bread and, in practice, panels $4\frac{1}{2}''$ wide by $6'$ high have been found satisfactory. Various types of foraminous material may be used and in practice, an open mesh material such as a wire screen having openings of perhaps an $\frac{1}{8}''$ or $\frac{1}{4}''$ will provide the desire results. The mesh material may be attached to the frame by welding, soldering, crimping or by any other well known means and, in the illustrated embodiment the frames are strips of sheet metal folded into U-shaped channels crimped along the edges of the screens and riveted at the corners.

Each frame is formed at the top thereof with extension legs 32 and 34 of a length of perhaps $1''$ or $1\frac{1}{2}''$ and on which is mounted an insulating handle 34 and 36 of wood, plastic or the like. The legs extend from opposite edges of the two panels and allow the holder to be conveniently lowered and raised in and out of the toaster and to protect the user thereof in the event that the holder becomes unduly hot from continued use.

Figure 2:
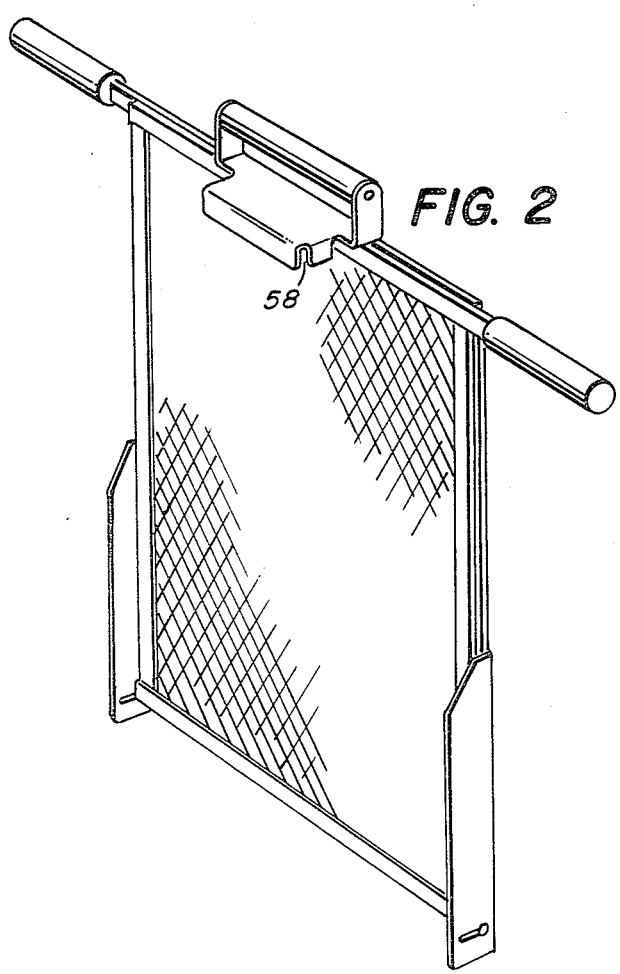
FIG. 2 is a view similar to FIG. 1 but showing the holder in closed position.
Figure 3:
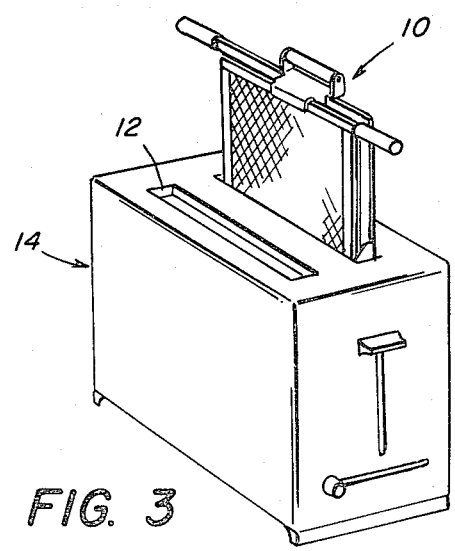
FIG. 3 is a view in perspective showing the holder partly inserted in a conventional toaster.

The panels are locked together at their upper edges by means of the latch 22 which is comprised of a crossbar 38, preferably of a thermally insulating material such as wood or the like, extending between a pair of upstanding ears 40 and 42 at opposite ends of a flat plate 44 pivoted at 46 to the upper cross-bar of the frame 26. The pivot connection for the latch 22 is off to one side and allows the latch to be raised or lowered for locking and unlocking the panels to one another. The latch center plate 44 is of a suitable material such as aluminum, stainless steel or the like and is formed with front and rear depending flanges 50 and 52, respectively, and a pair of depending side tabs 54 and 56 which are spaced from the front and rear flanges in order to define frame-engaging notches 58 and 60. In the event that a relatively thin sandwich or thin slice of bread is placed in the holder and the holder is closed the panels will be close to one another and are locked by swinging the latch down against the frame edges with the tabs 54 and 56 projecting outwardly from the top of the panel 18, as shown in FIG. 2. In the event that a thicker piece of bread or sandwich is placed in the holder and closed, the panels will be spaced further apart and the device is locked by swinging the latch down so that the outer notch 58 engages the top cross-bar of the frame 28 as in FIG. 5.

In order to avoid applying excessive pressure along the lower edge of a sandwich which might be relatively thick, the hinge connection is self-adjusting to accommodate different thicknesses of sandwiches. The hinge arrangement is generally organized about a pair of side plates 62 and 64 of L-shaped cross-section, one on each side of the holder and rigidly attached to the lower portion of the frame 26 for the panel 20. The side plates typically are about $3''$ in length and perhaps $\frac{1}{2}''$ in width.

At the lower end of each side plate is a slot 66 perpendicular to the plane of the panel 20 and through which extends a cross-pin 68. The cross-pin extends through the lower cross-bar of the frame 24 for the panel 18 and is somewhat loosely fitted into the slot to allow the panel 18 not only to pivot with respect to the panel 20, but also to have the lower edge thereof move to and away from the panel 20 to the extent of the length of the slot 66.

In order to maintain some inward pressure between the two panels, a leaf spring arrangement is provided to bear against opposite ends of the pin 68, each end having an enlarged head 70, 72. The spring arrangement is best shown in FIG. 7 and is comprised of an elongated flat spring 74 folded generally back upon itself to form a pair of generally coextensive and parallel legs 76 and 78. The bent portion of the spring extends through an opening 80 in the side plate with the lower end of the leg 78 anchored to the lower end of the plate by passing through an opening 82 and bent into place. The lower free end of the leg 76 bears against the cross-pin 68, urging it downwardly, as viewed in FIG. 7, thereby applying pressure on the panel 18 towards the panel 20. However, in the event that a relatively thick sandwich, such as shown in FIG. 5, is placed in the holder, the spring leg 76 will yield and the pin 68 will move out towards the extreme part of the slot 66, allowing the lower edge of the panel to move outwardly to accommodate the thicker sandwich.

In order to provide a decorative design to a toasted sandwich or to a plain piece of toast, various decorative devices may be added to the panel. For example, in FIG. 4 the letters "CF" preferably fabricated from a heat resistant material such as aluminum, are attached to one or both of the foraminous panels. The decorative devices shield the face of the bread from the heat of the toaster so that on the finished product the design, whether it be letters or some other design, will be reproduced on the sandwich, as suggested in FIG. 8. Thus, very personalized designs can be provided.

While the invention has been described with particular reference to the illustrated embodiment, numerous modifications thereto will appear to those skilled in the art.

Having thus described the invention, what I claim and desire to obtain by Letters Patents of the United States is:

1. An accessory for toasting sandwiches and the like in a toaster, comprising
   (a) first and second panels of generally rectangular outline and each of a generally stiff foraminous construction,
   (b) yieldable and extensible hinge means connecting said panels at their lower edges to permit said panels to open and close with respect to one another and hold a sandwich or the like there-between within a range of different thicknesses,
   (c) latching means movably mounted to one of said panels at the upper edge thereof and formed with a plurality of spaced locking portions adapted to lockably engage the other of said panels at selectively different positions corresponding to the thickness of the sandwich in said holder,
   (d) said hinge means including a member mounted to each side of one of said panels and having a portion thereof extending perpendicularly from the plane of said one panel, each of said members being formed with a slot extending perpendicularly to the plane of said one panel, the slot in one member being in opposing registration with the slot in the other member, a pivot pin mounted to each lower corner of the other of said panels and extending from opposite sides thereof and into said slots and spring means connected between said one panel and said pins and urging said panels together.

2. An accessory according to claim 1 including at least one thermally insulating handle connected to each of said panels at the top portion thereof.

3. An accessory according to claim 1 wherein said spring means includes a pair of U-shaped springs one at each of said members, one leg of each spring being attached to a member and the other leg engaging one of said pins.

4. An accessory according to claim 1 wherein said latching means includes a latch body pivotally connected at one end to the upper edge of one of said panels for pivoting movement in the plane of said one panel, said latch body being formed with spaced parallel flanges depending from the front and rear edges thereof for lockably engaging the upper edges of both of said panels for maximum spacing between said panels, said latch body being also formed with a pair of depending side tabs between said flanges, said side tabs and one of said flanges adapted to engage the upper edges of said panels for minimum spacing between said panels.

5. An accessory according to claim 1 including a design element mounted to the face of at least one of said panels for reproducing the design of said element on a sandwich toasted in said accessory.

6. An accessory for toasting sandwiches and the like in a toaster, comprising
   (a) first and second panels of generally rectangular outline and each of a generally stiff foraminous construction,
   (b) yieldable and extensible hinge means connecting said panels at their lower edges to permit said panels to open and close with respect to one another and hold a sandwich or the like therebetween within a range of different thicknesses, and,
   (c) latching means movably mounyted to one of said panels at the upper edge thereof and formed with a plurality of spaced locking portions adapted to lockably engage the other of said panels at selectively different positions corresponding to the thickness of the sandwich in said holder, said latching means including a latch body pivotally connected at one end to the upper edge of one of said panels for pivoting movement in the plane of said one panel, said latch body being formed with spaced parallel flanges depending from the front and rear edges thereof for lockably engaging the upper edges of both of said panels for maximum spacing between said panels, said latch body being also formed with a pair of depending side tabs between said flanges, said side tabs and one of said flanges adapted to engage the upper edges of said panels for minimum spacing between said panels.

7. An accessory according to claim 6 including at least one thermally insulating handle connected to each of said panels at the top portion thereof.

8. An accessory according to claim 6 including a design element mounted to the face of at least one of said panels for reproducing the design of said element on a sandwich toasted in said accessory.

* * * * *

UNITED STATES PATENT OFFICE
CERTIFICATE OF CORRECTION

PATENT NO. : 4,290,349

DATED : September 22, 1981

INVENTOR(S) : Castenzio Fiorenza

It is certified that error appears in the above—identified patent and that said Letters Patent are hereby corrected as shown below:

On the title page, at [76], the inventor's address is corrected to ---- 43 Main St., ----

Signed and Sealed this

Nineteenth Day of January 1982

[SEAL]

*Attest:*

*Attesting Officer*

GERALD J. MOSSINGHOFF

*Commissioner of Patents and Trademarks*